United States Patent
Mizukami et al.

(10) Patent No.: US 10,802,530 B2
(45) Date of Patent: Oct. 13, 2020

(54) INPUT DEVICE

(71) Applicant: Panasonic Intellectual Property Management Co., Ltd., Osaka (JP)

(72) Inventors: Masahiro Mizukami, Fukui (JP); Toshio Tanaka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 224 days.

(21) Appl. No.: 15/981,668

(22) Filed: May 16, 2018

(65) Prior Publication Data

US 2018/0348808 A1    Dec. 6, 2018

(30) Foreign Application Priority Data

May 31, 2017    (JP) ................. 2017-108112

(51) Int. Cl.

| | |
|---|---|
| G05G 5/03 | (2008.04) |
| G05G 5/06 | (2006.01) |
| F16H 59/10 | (2006.01) |
| G05G 5/05 | (2006.01) |
| F16H 59/02 | (2006.01) |
| F16H 61/24 | (2006.01) |
| F16H 61/32 | (2006.01) |

(52) U.S. Cl.
CPC ............. *G05G 5/03* (2013.01); *F16H 59/10* (2013.01); *G05G 5/05* (2013.01); *G05G 5/06* (2013.01); *F16H 2059/0295* (2013.01); *F16H 2061/247* (2013.01); *F16H 2061/326* (2013.01)

(58) Field of Classification Search
CPC .. G05G 5/03; G05G 5/02; G05G 5/06; G05G 5/065; G05G 5/08; G05G 5/05; F16H 2061/247; F16H 2061/243; F16H 61/24
See application file for complete search history.

(56) References Cited

U.S. PATENT DOCUMENTS

| | | | |
|---|---|---|---|
| 6,361,473 B1 * | 3/2002 | Mason ................. | B60W 10/06 477/124 |
| 8,485,061 B2 * | 7/2013 | Kliemannel ........ | F16H 59/0204 74/473.23 |
| 2010/0307276 A1 * | 12/2010 | Giefer ................... | F16H 59/10 74/473.3 |
| 2013/0139632 A1 | 6/2013 | Rake et al. | |
| 2016/0319929 A1 * | 11/2016 | Kim ........................ | F16H 61/22 |
| 2017/0059034 A1 * | 3/2017 | Makimura ........... | F16H 59/0278 |

FOREIGN PATENT DOCUMENTS

JP    2015-072718 A    4/2015

* cited by examiner

*Primary Examiner* — Richard W Ridley
*Assistant Examiner* — Brian J McGovern
(74) *Attorney, Agent, or Firm* — Seed IP Law Group LLP

(57) ABSTRACT

An input device includes: an operating unit that is operated by a user; a detent pin that is displaceable along with an operation of the operating unit; a columnar detent member where a spiral groove about a predetermined axis A is formed on an outer peripheral surface of the detent member that is contact with the detent pin; and a motor (rotary driving part) that rotates the detent member about axis A.

9 Claims, 13 Drawing Sheets

INPUT DEVICE

TECHNICAL FIELD

The present disclosure relates to an input device, such as a shift lever of a vehicle, for example.

BACKGROUND ART

Conventionally, as a shift device of a vehicle provided with a multistage transmission, there has been known a lever input device, for example. As such a lever input device, there have been known a mono-stable type lever input device and a multi-stable type lever input device. Of these input devices, the mono-stable type lever input device is a device where a lever is automatically returned to one predetermined position after a transmission operation by a user. On the other hand, a lever input device disclosed in PTL 1 is a multi-stable type device where, even after a transmission operation, a lever is held at a position shifted after the transmission operation.

The input device disclosed in PTL 1 includes an operation knob, a latch pin linked to the operation knob, and a latch recessed portion which is engaged with the latch pin. When a user performs a slide operation of the operation knob, an engaging portion of the latch pin at which the latch pin is engaged with the latch recessed portion is changed. With such a configuration, it is possible to impart clicking sensation to a user and, at the same time, the operation knob can be held at a predetermined operation position.

Such an input device further includes an actuator gear on which the above-mentioned latch recessed portion is integrally formed. Accordingly, even in a state where a user does not operate the operation knob, the operation knob can be displaced in a slidable manner by the actuator. That is, when the actuator gear is driven by a motor or the like, the latch recessed portion is also displaced together with the actuator gear. As a result, the operation knob is moved in a slidable manner by way of the latch pin engaged with the latch recessed portion.

With such a configuration, in the multi-stable type input device disclosed in PTL 1, the position of the operation knob can be automatically changed corresponding to a range after transmission operation even in an automatic transmission where a user does not operate the operation knob. That is, the input device of PTL 1 can be operated manually or automatically.

CITATION LIST

Patent Literature

PTL 1: Unexamined Japanese Patent Publication No. 2015-72718

SUMMARY OF THE INVENTION

It is an object of the present disclosure to provide an input device which can be operated manually or automatically, and can impart different clicking sensation to a user corresponding to a position of an operating unit at the time of manual operation.

An input device according to the present disclosure includes an operating unit, a detent pin, a detent member, and a rotary driving part. The operating unit is operated by a user. The detent pin is displaced along first directions along with an operation of the operating unit. The detent member is a columnar member where a spiral groove about a predetermined axis is formed on an outer peripheral surface of the detent member which is in contact with the detent pin. The rotary driving part rotates the detent member about the axis. When the operating unit is operated in a state where the detent member is stopped, the detent pin moves slidably so as to traverse the spiral groove along the outer peripheral surface of the detent member in directions along the axis, so that clicking sensation corresponding to the position of the operating unit is imparted to a user. When the detent member is rotated in a state where the operating unit is not operated, the detent pin is guided in the directions along the axis by slidably moving along the spiral groove.

With such a configuration, the above-mentioned input device can be operated by a manual operation where the operating unit is operated in a state where the detent member is stopped or by an automatic operation where the operating unit is displaced due to the rotation of the detent member in a state where the operating unit is not operated. Further, at the time of manual operation, different clicking sensation can be imparted to a user corresponding to the position of the detent pin which slidably moves on the outer peripheral surface of the detent member, that is, the position of the operating unit.

Further, the detent member has an inclined surface which forms the spiral groove and is in slide contact with the detent pin, and the inclined surface has a curved conical surface of a right circular cone in a predetermined angular region about the axis. When a contact point between the detent pin and the spiral groove is within the conical surface, regardless of a rotation position of the detent member, the position of the detent pin in the directions along the axis is unchanged.

With such a configuration, even when the position (the stop position around the axis) of the detent member at the time of finishing the automatic operation is slightly displaced, so long as a contact point between the detent pin and the detent member is within the conical surface constantly, there is no change in clicking sensation at the time of manual operation, and therefore, a user does not feel a sense of discomfort.

The input device may further include: a lock pin which is displaced with the operation of the operating unit; a lock pin restricting member which is configured to restrict displacement of the lock pin; and a restriction switching part which switches the lock pin restricting member between a restricting position where the displacement of the lock pin is restricted and a releasing position where the restricting of the lock pin is released.

Thus, an operation state of the input device can be easily switched between a manual operation state where the lock pin is restricted by the lock pin restricting member and an automatic operation state where the restriction of the lock pin by the lock pin restricting member is released.

Advantageous Effect of Invention

According to the present disclosure, it is possible to provide an input device which can be operated manually or automatically, and can impart different clicking sensation to a user corresponding to a position of an operating unit at the time of manual operation.

DESCRIPTION OF EMBODIMENT

Technical Problem

Prior to the description of an exemplary embodiment of the present invention, a problem which a conventional device has is briefly described. The input device of PTL 1 cannot generate different clicking sensation corresponding to the position of the operation knob with respect to clicking sensation which is imparted to a user at the time of manual operation. For example, assume that the operation knob positioned at a first position is displaced to a second position automatically and, thereafter, the operation knob is returned to the first position again manually. In such a case, a latch recessed portion with which a latch pin is engaged when the operation knob is initially positioned at the first position and a latch recessed portion with which the latch pin is engaged when the operation knob is returned to the first position again are different from each other.

In this manner, in the input device of PTL 1, the plurality of latch recessed portions with which the latch pin is engaged are provided for respective positions of the operation knob. Accordingly, to prevent a sense of discomfort from being imparted to a user at the time of manual operation, there is no choice but to form all of the latch recessed portions into the same shape. Accordingly, it is only possible to generate the same clicking sensation regardless of the position of the operation knob.

Hereinafter, a preferred exemplary embodiment of an input device according to the present disclosure is described by taking a lever input device which is applied to a shift device of a vehicle as an example.

Overall Configuration of Input Device

Figure 1:
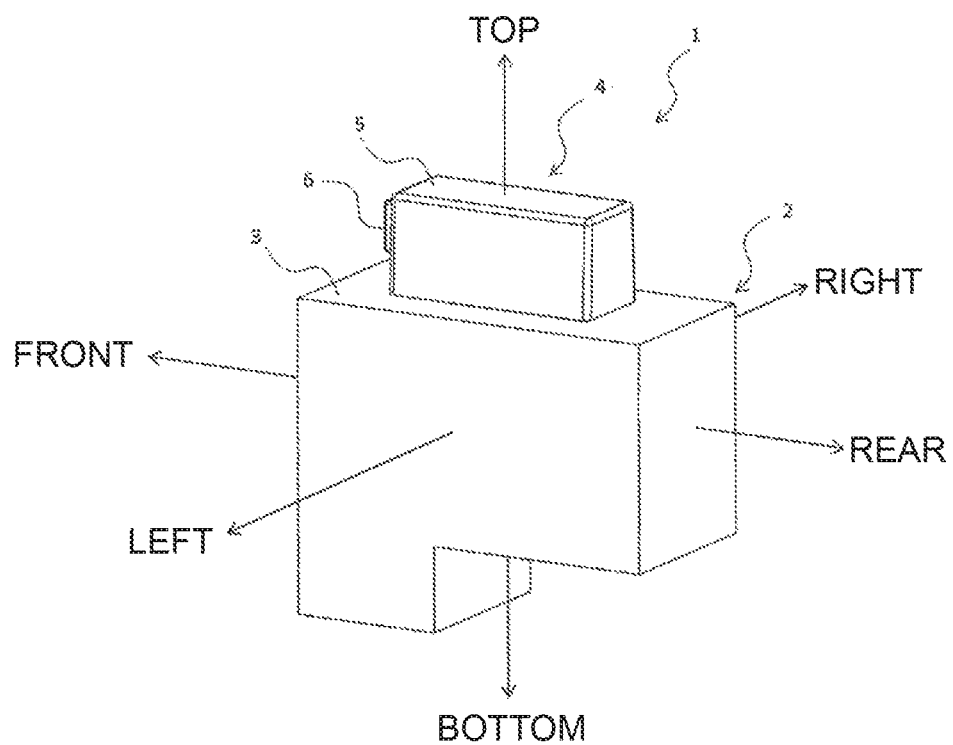
FIG. 1 is a perspective view illustrating an external configuration of a lever input device according to an exemplary embodiment of the present disclosure.

FIG. 1 is a perspective view illustrating an external configuration of a lever input device according to an exemplary embodiment of the present invention. As illustrated in FIG. 1, lever input device 1 includes body portion 2 which is fixedly mounted on a center console of a vehicle, for example, and body portion 2 includes box-shaped body casing 3. Further, lever input device 1 includes operating unit 4 which is operated by a user. Operating unit 4 includes rectangular hollow-shaped gripping member 5 which is gripped by a user at the time of operation, and gripping member 5 is positioned on an upper surface of body casing 3. Operating unit 4 is displaceable in predetermined directions with respect to body portion 2 due to an operation by a user.

Hereinafter, displacement directions of operating unit 4 with respect to body portion 2 is defined as front-rear directions (first directions), and directions orthogonal to the front-rear directions are respectively defined as right-left directions and top-bottom directions as shown in FIG. 1. The arrangement of respective portions of lever input device 1 are not limited to such directions, and lever input device 1 may be arranged in different directions. The position of operating unit 4 corresponds to five ranges consisting of a parking range (P range), a rear range (R range), a neutral range (N range), a drive range (D range), and a sporting range (S range) in order from a front side, for example.

Figure 2:
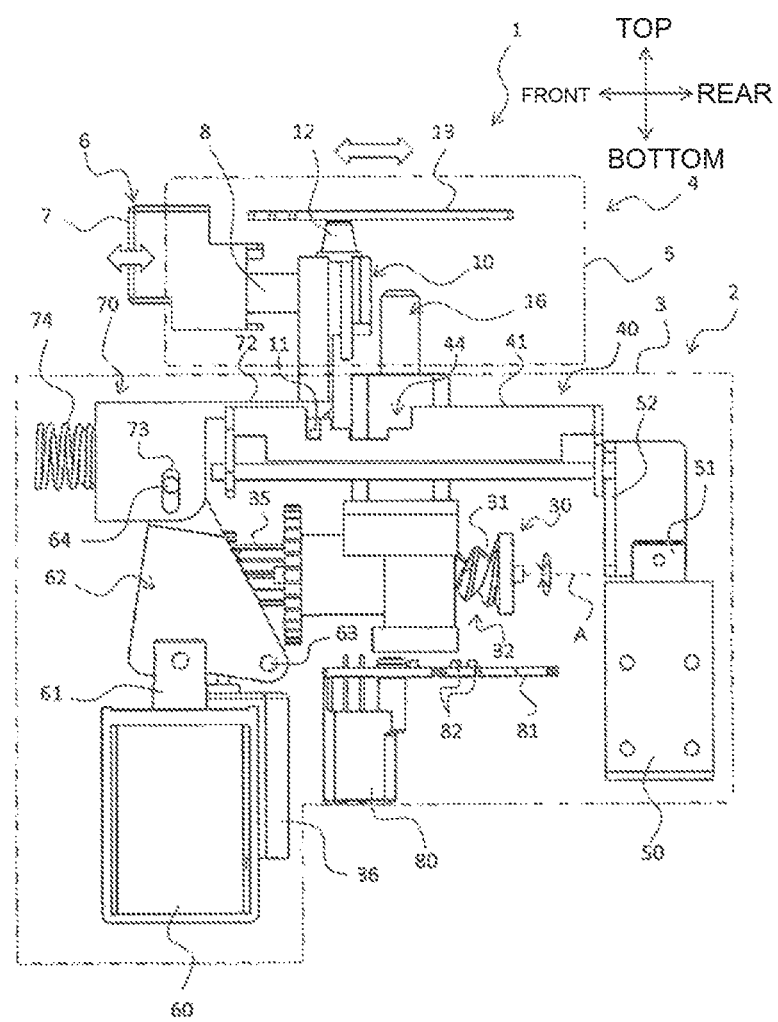
FIG. 2 is a side view illustrating an internal structure of the lever input device.
Figure 3:
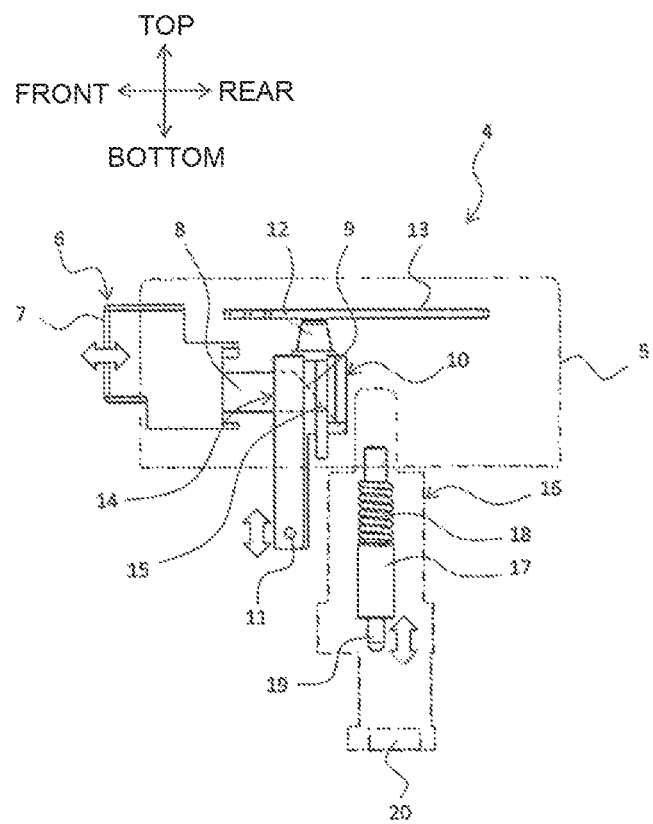
FIG. 3 is a side view illustrating a structure of an operating unit.
Figure 4:
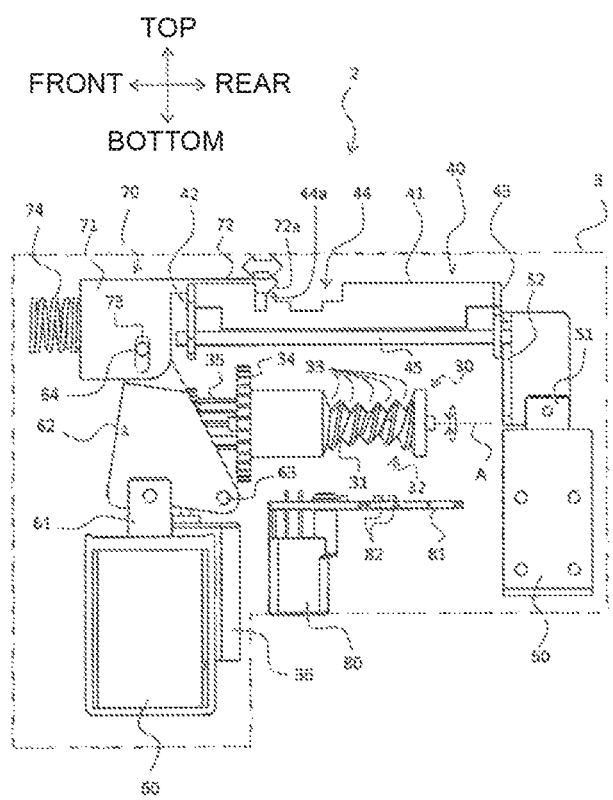
FIG. 4 is a side view illustrating a structure of a body portion.
Figure 5:
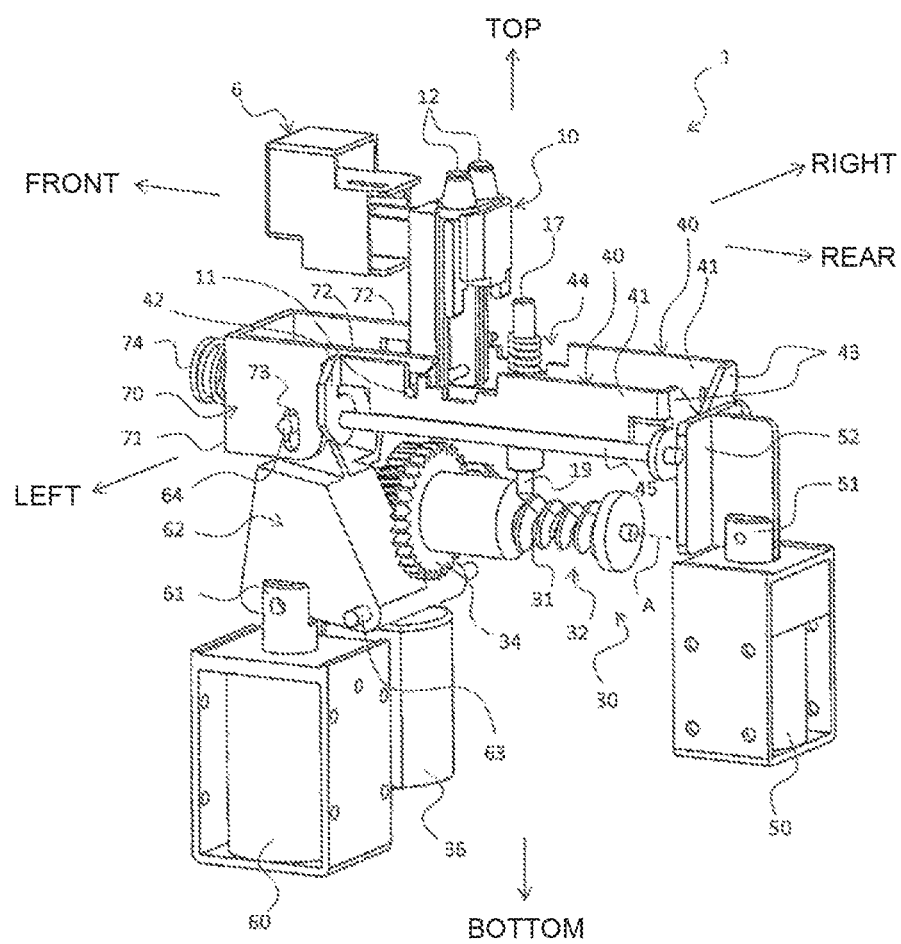
FIG. 5 is a perspective view of the internal structure of the lever input device as viewed in a certain direction.
Figure 6:
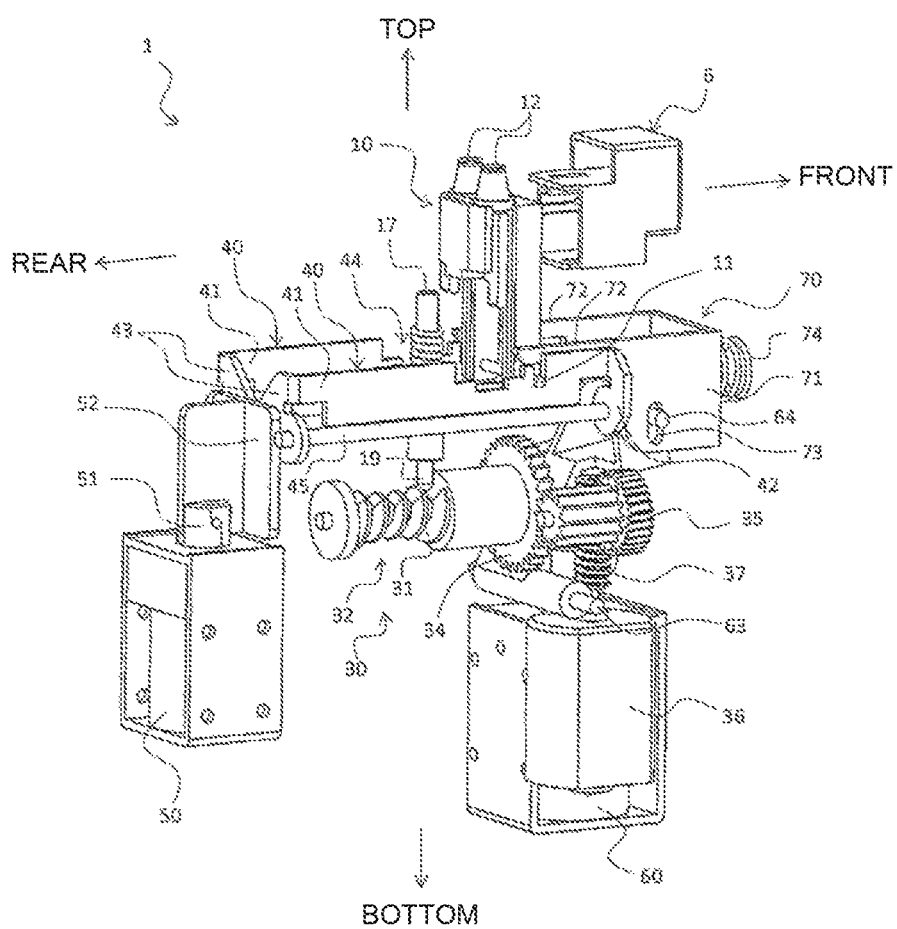
FIG. 6 is a perspective view of the internal structure of the lever input device as viewed in another direction.
Figure 7:
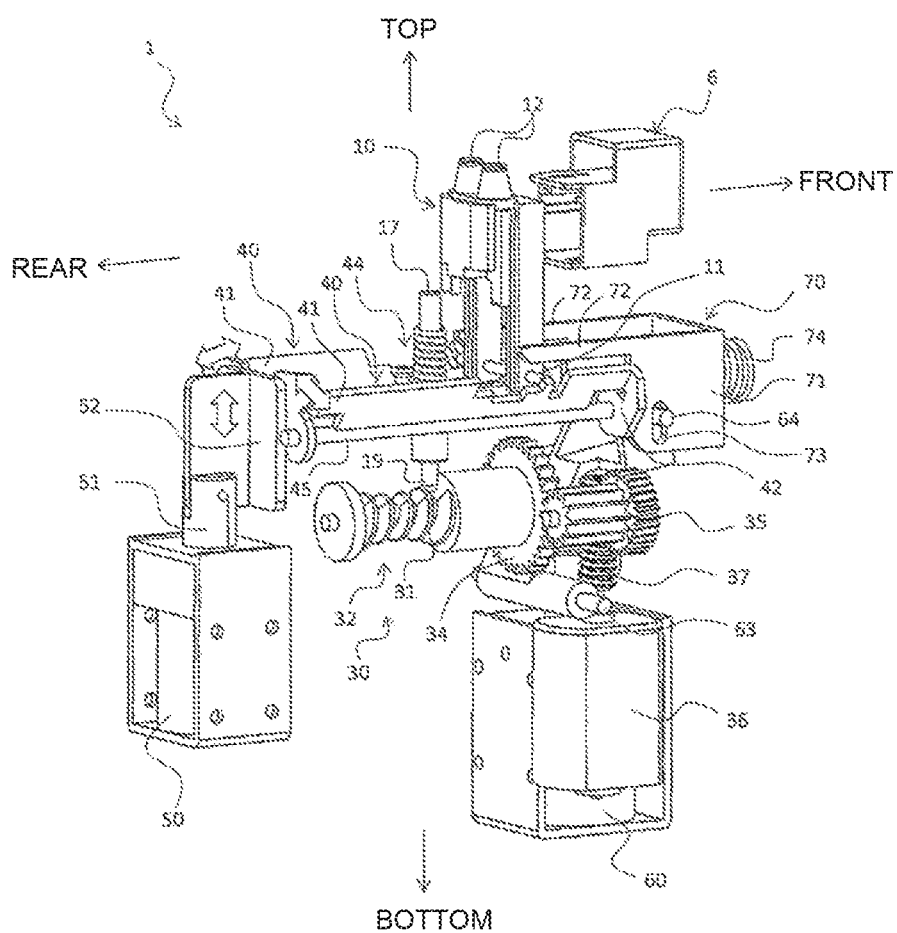
FIG. 7 is a perspective view illustrating a state of the lever input device shown in FIG. 6 where restriction of a lock pin is released.

FIG. 2 is a side view illustrating an internal structure of lever input device 1, FIG. 3 is a side view illustrating a structure of operating unit 4, and FIG. 4 is a side view illustrating a structure of body portion 2. FIG. 5 is a perspective view of the internal structure of lever input device 1 as viewed in a certain direction, and FIG. 6 is a perspective view of the internal structure of lever input device 1 as viewed in another direction. FIG. 7 is a perspective view illustrating a state of the lever input device shown in FIG. 6 where restriction of a lock pin is released. That is, FIG. 6 illustrates a state of the lever input device at the time of manual operation, and FIG. 7 illustrates a state of the lever input device at the time of automatic operation. In FIG. 5 and FIG. 6, for the sake of convenience of the description, body casing 3, gripping member 5 and the like are omitted.

Configuration of Operating Unit

Next, a configuration of operating unit 4 is described in detail. Although the description is made mainly with reference to FIG. 2 and FIG. 3 which are side views, the description is made also with reference to FIG. 5 and FIG. 6 which are perspective views as appropriate.

As illustrated in FIG. 2 and FIG. 3, operating unit 4 includes button 6 which is pressed by a user on a front portion of gripping member 5. Button 6 has pushing portion 7 having a rectangular parallelepiped shape with which a finger of a user is brought into pressure contact, and extension portion 8 which extends rearward from pushing portion 7. A front portion of pushing portion 7 is exposed so as to project frontward from a rectangular opening formed in a front surface of gripping member 5. An inclined surface 9 extending downward as inclined surface 9 extends rearward is formed on a rear end portion of extension portion 8. Such a button 6 is supported at a suitable position in the inside of gripping member 5 in an advanceable and retractable manner in the front-rear directions.

Lock pin support portion 10 extending in the top-bottom directions is disposed in the inside of gripping member 5 in a vertically movable manner. Rod-shaped lock pin 11 having an axis extending in the right-left directions is supported at a lower end portion of lock pin support portion 10 (see also FIG. 5 and FIG. 6), and two rubber domes 12 each having a hollow truncated conical shape are disposed at an upper end portion of lock pin support portion 10 to be parallel to each other in the right-left directions. Further, plate 13 is fixedly mounted inside of gripping member 5 so as to be brought into contact with upper ends of rubber domes 12.

A recessed portion 14 which opens frontward is formed on an upper portion of lock pin support portion 10, and a back surface of recessed portion 14 (a bottom surface on a rear side) is formed as inclined surface 15 which extends downward as inclined surface 15 extends rearward. A rear portion of extension portion 8 of button 6 is inserted into recessed portion 14, and inclined surface 9 of the rear end portion of extension portion 8 and inclined surface 15 of the back surface of recessed portion 14 are in contact with each other. Accordingly, when button 6 is pressed rearward by a user, inclined surface 9 and inclined surface 15 are pressed to each other, so that lock pin support portion 10 is biased upward together with lock pin 11. When a pressing force by a user reaches a predetermined first threshold value, rubber domes 12 are pressed to plate 13 and are contracted upward only by one stage, and clicking sensation is imparted to the user along with the elevation of lock pin 11. When the pressing force by the user is further increased and reaches a predetermined second threshold value, rubber domes 12 are further contracted, and second clicking sensation is imparted to the user along with the further elevation of lock pin 11.

In this manner, button 6 can be pressed in two stages from a non-pressed state. Accordingly, lock pin 11 can be also displaced at three height levels. Lock pin support portion 10 is supported by gripping member 5 such that lock pin support portion 10 is not displaced rearward when lock pin support portion 10 is pressed by button 6. When a user releases a pressing force applied to button 6 in a state where lock pin support portion 10 is elevated by one stage or two stages, lock pin support portion 10 is displaced downward by being pressed by a resilient force that rubber domes 12 tend to expand, and along with such a displacement, button 6 projects frontward again and is returned to an initial position.

Operating slider 16 is supported on gripping member 5. Operating slider 16 has its longitudinal length in the vertical length, and an upper portion of operating slider 16 is fixed to a predetermined portion in the inside of gripping member 5. A cylindrical hole (not illustrated) which opens downward is formed in a center portion of operating slider 16, and plunger 17 and biasing spring 18 are accommodated in the cylindrical hole (see also FIG. 5 and FIG. 6). A lower portion of plunger 17 projects downward from the cylindrical hole, and is biased more downward by a biasing spring 18. A lower end portion of plunger 17 forms detent pin 19 of which a distal end (lower end) is formed into a semispherical shape, and a distal end of detent pin 19 is in contact with spiral groove 31 of detent member 30 to be described later (see also FIG. 5 and FIG. 6) from above. Magnet 20 is supported on a lower end portion of operating slider 16.

Operating unit 4 is connected to body casing 3 of body portion 2 in displaceable (slidable) manner only in the front-rear directions. Further, button 6, lock pin support portion 10, lock pin 11, operating slider 16, detent pin 19, magnet 20 and the like are all directly or indirectly supported by gripping member 5. Accordingly, along with an operation of operating unit 4 by a user, these components are displaced in the front-rear directions to be thus switchable between the above-mentioned five ranges (P, R, N, D, and S).

Configuration of Body Portion

Figure 14:
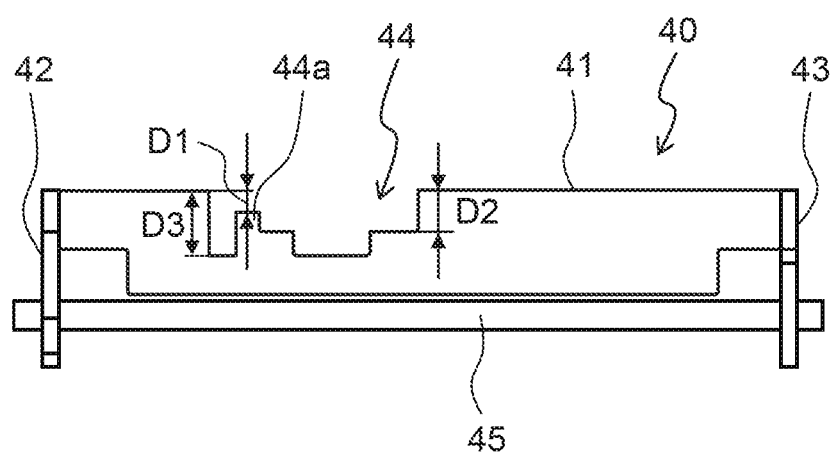
FIG. 14 is a side view illustrating a lock plate.

Next, a configuration of body portion 2 is described in detail. Although the description is made mainly with reference to FIG. 2, FIG. 4 and FIG. 14 which are side views, the description is made also with reference to FIG. 5 to FIG. 7 which are perspective views as appropriate.

Body portion 2 includes detent member 30 which is engaged with above-mentioned detent pin 19 in the inside of body casing 3. Detent member 30 has a columnar shape having axis A extending along the front-rear directions, and spiral groove 31 with an axis A as a center is formed on an outer peripheral surface of a portion ranging from an approximately center to an approximately rear end of detent member 30 in the front-rear directions. A portion of detent member 30 where spiral groove 31 is formed forms detent portion 32, and above-mentioned detent pin 19 is brought into contact with detent portion 32 from above.

When focus is placed on an upper portion of detent portion 32, five clicking sensation grooves 33 are formed parallel to each other in the front-rear directions by spiral groove 31. Five clicking sensation grooves 33 respectively correspond to positions of operating unit 4 at the respective ranges. That is, when operating unit 4 is at the P range, detent pin 19 is engaged with clicking sensation groove 33 at the frontmost position. When operating unit 4 is at the R range, detent pin 19 is engaged with clicking sensation groove 33 which is a second clicking sensation groove 33 counted from a front side. When operating unit 4 is at the N range, detent pin 19 is engaged with clicking sensation groove 33 which is a third clicking sensation groove 33 counted from the front side. When operating unit 4 is at the D range, detent pin 19 is engaged with clicking sensation groove 33 which is a fourth clicking sensation groove 33 counted from the front side. When operating unit 4 is at the S range, detent pin 19 is engaged with clicking sensation groove 33 at the rearmost position.

Gear 34 having a large diameter is integrally formed on a front end portion of detent member 30, and worm gear 37 which is mounted on an output shaft of motor (rotary driving part) 36 is engaged with gear 34 by way of deceleration gear 35 (see also FIG. 6). Accordingly, when motor 36 is driven, due to rotational force which is transmitted through deceleration gear 35, detent member 30 is rotated about axis A. When detent member 30 is rotated, detent pin 19 which is engaged with spiral groove 31 slidably moves along spiral groove 31 and, at the same time, is biased in the front-rear directions by the inclined surface of spiral groove 31. Each time that detent member 30 rotates one time (360 degrees) about axis A, operating unit 4 is displaced (slid) to the next range position corresponding to rotating directions of detent member 30.

A pair of right and left lock plates (lock pin restricting members) 40 is disposed above detent member 30. Each lock plate 40 is formed in a plate shape elongated in the front-rear directions, and has plate portion 41 having surfaces thereof directed in the right-left directions (that is, in an erected state) at the time of manually operating lever input device 1 (in a first state), and flange portions 42, 43 which are bent rightward and leftward from front and rear end portions of plate portion 41 respectively.

Restricting groove 44 is formed on upper portion of plate portion 41 by cutting away in a predetermined shape, and lock pin 11 of operating unit 4 is fitted in restricting groove 44 from above. Through holes are formed in flange portions 42, 43 to be concentric with each other, and lock shaft 45 which is supported on body casing 3 is made to pass through the through holes.

First solenoid 50 is disposed behind and below lock plate 40, and first solenoid 50 has plunger 51 which is advanceable and retractable in the top-bottom directions. Carrier plate 52 having surfaces thereof directed in the front-rear directions is connected to an upper portion of plunger 51, and a pair of right and left engaging projections (not illustrated) which projects frontward is formed on an upper portion of carrier plate 52. These engaging projections are fitted in engagement holes (not illustrated) formed in flange portion 43 on a rear side of lock plate 40.

Accordingly, lever input device 1 is configured such that right and left lock plate 40 can be switched between a state where plate portions 41 are erected upright (see FIG. 6) and a state where plate portions 41 are inclined outward (see FIG. 7) by driving first solenoid 50.

That is, when plunger 51 of first solenoid 50 is positioned on a lower side, plate portion 41 of lock plate 40 is erected upright as illustrated in FIG. 6. As a result, a state is brought about where lock pin 11 is engaged with restricting groove 44 of lock plate 40, and displacement of operating unit 4 in the front-rear directions is restricted. In this case, for example, operating unit 4 is operated manually. Hereinafter, such a state is referred to as "manual operation state".

On the other hand, when first solenoid 50 is driven and plunger 51 is positioned on an upper side, plate portions 41 of lock plate 40 are inclined such that upper portions of plate portions 41 are disposed more outside than lower portion of plate portions 41 as illustrated in FIG. 7. As a result, engagement of restricting groove 44 of lock plate 40 and lock pin 11 is released, and a state is brought about where displacement of operating unit 4 in the front-rear directions is not restricted. In this case, operating unit 4 is brought into a state where operating unit 4 is not operated manually and an automatic parking function is activated so that movement of operating unit 4 is controlled by the controller of the vehicle, for example. Hereinafter, such a state is referred to as "automatic operation state".

Second solenoid 60 is disposed in front of and below lock plate 40, and second solenoid 60 has plunger 61 which is advanceable and retractable in the top-bottom directions. An upper portion of plunger 61 is connected to cam lever 62. Cam lever 62 has an approximately triangular shape in a side view, and is provided with a fulcrum, a power point, and an acting point at three apexes of the cam lever 62.

Out of three apex portions, support pin 63 which projects outward in the right-left directions is mounted on a fulcrum portion, and support pin 63 is supported by body casing 3 such that cam lever 62 is rotatable about an axis of support pin 63 extending in the right-left directions. A power point portion is disposed on an upper portion of plunger 61, and is connected to operate cam lever 62 in the top-bottom directions and enable cam lever 62 to rotate about the axis of support pin 63 extending in the right-left directions. Further, support pin 64 projecting outward in the right-left directions is disposed also on an acting point portion. Support pin 64 is connected to lock slider 70 which is disposed in front of lock plate 40.

Lock slider 70 includes; base portion 71 which has a pair of right and left side surface members and a front surface member which connects front end portions of the side surface members to each other; and arm portions 72 which extend rearward from rear ends of upper portions of the right and left side surface members of base portion 71. Elongated hole 73 elongated in the top-bottom directions is formed in each side surface member of base portion 71, and support pin 64 positioned at the acting point of cam lever 62 described above is fitted in elongated hole 73. Biasing spring 74 in a shrunken state is disposed between the front surface member of base portion 71 and an inner wall surface of body casing 3, thus biasing lock slider 70 rearward. Further, lock slider 70 is supported by body casing 3 in a slidable manner only in the front-rear directions.

Accordingly, when second solenoid 60 is not driven and plunger 61 is positioned at an upper side, lock slider 70 is pressed by biasing spring 74 and is positioned at a rear side. On the other hand, when second solenoid 60 is driven and plunger 61 is displaced to a lower side, cam lever 62 is rotated about the fulcrum (rotated in a counterclockwise direction about support pin 63 in FIG. 4), so that lock slider 70 is displaced frontward against biasing spring 74.

Meanwhile, arm portion 72 of lock slider 70 locks lock pin 11 such that lock pin 11 positioned in the inside of restricting groove 44 formed in lock plate 40 cannot be elevated. Such a configuration is described specifically. As illustrated in FIG. 4, restricting groove 44 has a depth size corresponding to the position of lock pin 11 at each range position of operating unit 4.

For example, when operating unit 4 is at the P range, a groove portion of restricting groove 44 corresponding to lock pin 11 has a largest depth size (depth D3 from an upper end of lock plate 40). When operating unit 4 is at the N range and the D range, the groove portion of restricting groove 44 corresponding to lock pin 11 also has the same depth D3, as in the case where operating unit 4 is at the P range. When operating unit 4 is at the R range and the S range, the groove portion of restricting groove 44 corresponding to lock pin 11 has depth D2 slightly shallower than depth D3 (D2<D3). Further, projection 44a having a depth D1 further slightly shallower than depth D2 (D1<D2) is provided between a portion corresponding to the P range and a portion corresponding to the R range (see FIG. 4 and FIG. 14).

In a state where second solenoid 60 is not driven, a distal end portion positioned behind arm portion 72 is biased by biasing spring 74 and is positioned at a rearmost position, thus closing an upper portion of the groove portion of restricting groove 44 corresponding to the P range (see FIG. 4 to FIG. 6). Accordingly, when operating unit 4 is at the P range and arm portion 72 is positioned behind operating unit 4, elevation of lock pin 11 is restricted by arm portion 72 even when a user presses button 6.

Meanwhile, in lever input device 1 according to the present disclosure, second solenoid 60 is driven by stepping on a foot brake of the vehicle, for example. Then, lock slider 70 is displaced frontward, and arm portion 72 is retracted frontward from an upper portion of the groove portion of restricting groove 44 corresponding to the P range. As a result, when a user presses button 6 in such a state, lock pin 11 can elevate to the vicinity of an upper end of lock plate 40. Accordingly, when operating unit 4 is further operated rearward, lock pin 11 is displaced to the groove portion corresponding to another range beyond projection 44a.

On a distal end portion positioned on a rear side of arm portion 72, downwardly inclined surface 72a which extends downward as inclined surface 72a extends frontward is formed. Accordingly, assume that operating unit 4 is operated frontward in a state where lock pin 11 is at the same height as arm portion 72 in the groove portion corresponding to the R range, for example. In this case, lock pin 11 moves arm portion 72 frontward by pushing arm portion 72 against biasing spring 74. Thereafter, when lock pin 11 arrives at an upper side of the groove portion corresponding to the P range and releases pressing of button 6, due to a downward reaction force from inclined surface 72a, lock pin 11 is descended and accommodated in the groove portion corresponding to the P range.

As has been already described heretofore, rubber domes 12 are configured in an extensible and shrinkable manner in two stages, and lock pin 11 is elevated or lowered in two stages. In a state where button 6 is not operated, lock pin 11 can be lowered to a lowermost position, that is, a position at depth D3 of restricting groove 44. When button 6 is pressed only by one stage from such a state, lock pin 11 is elevated to a position at depth D2. When button 6 is further pressed by two stages in total, lock pin 11 is elevated to a position at depth D1.

As illustrated in FIG. 2 and FIG. 4, connector 80 to be connected to a vehicle is disposed inside of body casing 3, and printed circuit board 81 is connected to an upper portion of connector 80. Further, a plurality of magnetic detection sensors 82 are mounted on printed circuit board 81. Magnetic detection sensors 82 are positioned so as to opposedly face magnet 20 which is displaceable in the front-rear directions together with operating unit 4, and are configured to detect a current position (range) of operating unit 4 by detecting a relative position with respect to magnet 20.

Manner of Operation in Manual Operation State

Next, the manner of operation of above-mentioned lever input device 1 in a manual operation state is described. Hereinafter, for the sake of convenience of description, the groove portion of restricting groove 44 of lock plate 40 corresponding to the P range is referred to as "P range restricting groove 44*p*". In the same manner, the groove portions corresponding to the R range, the N range, the D range, and the S range are respectively referred to as "R range restricting groove 44*r*", "N range restricting groove 44*n*", "D range restricting groove 44*d*", and "S range restricting groove 44*s*".

Out of clicking sensation grooves 33 of detent member 30, clicking sensation groove 33 corresponding to the P range is referred to as "P range clicking sensation groove 33*p*". In the same manner, clicking sensation grooves 33 corresponding to the R range, the N range, D range, and the S range are respectively referred to as "R range clicking sensation groove 33*r*", "N range clicking sensation groove 33*n*", "D range clicking sensation groove 33*d*", and "S range clicking sensation groove 33*s*".

Manner of Operation From P Range to R Range

Figure 8:
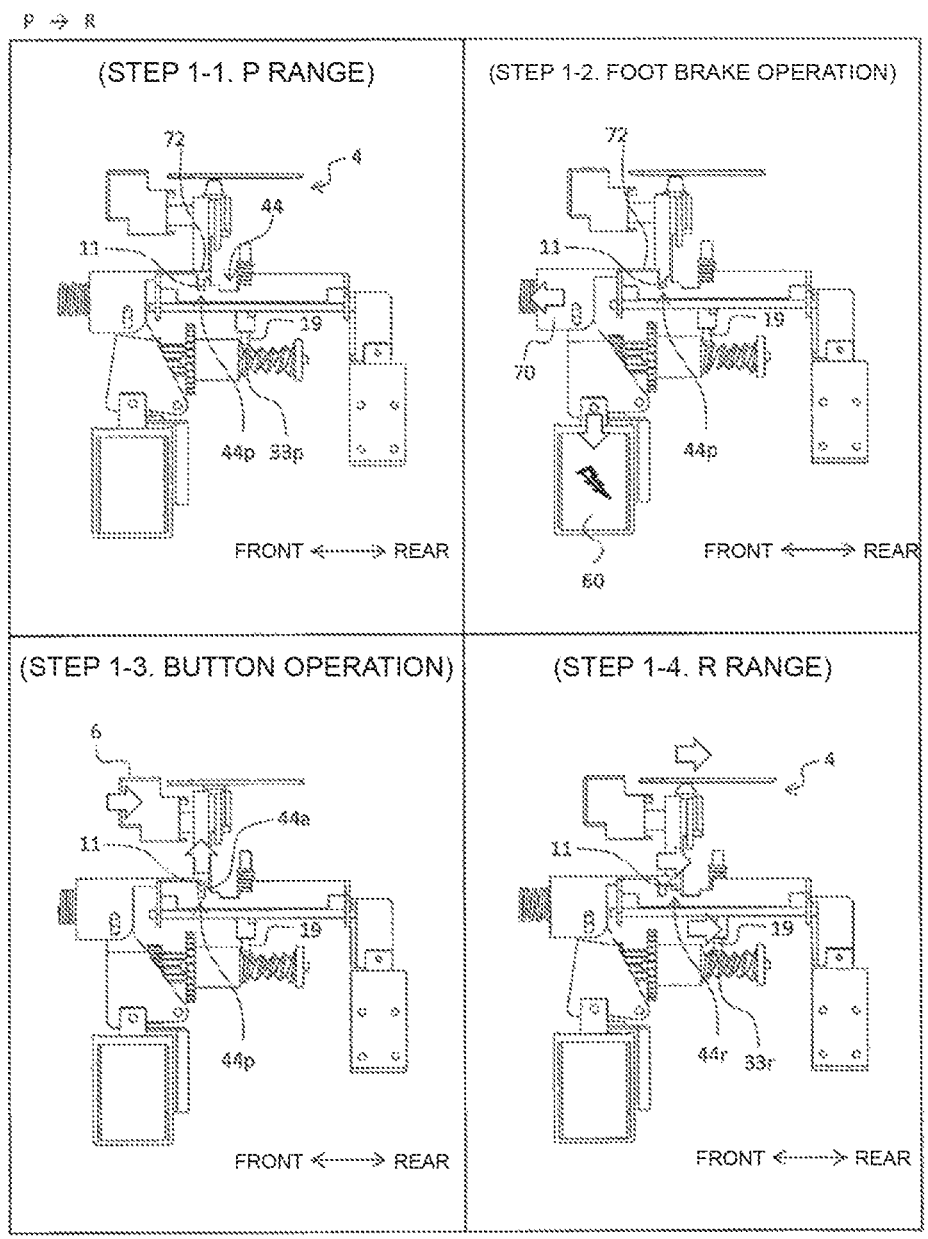
FIG. 8 is a schematic view for describing the manner of operation of the lever input device at the time of switching a range from a P position to an R position.

First, the manner of operation when operating unit 4 is switched from the P range to the R range is described with reference to FIG. 8. In FIG. 8, for the sake of convenience of description, some parts of the configuration are omitted.

As illustrated in FIG. 8, operating unit 4 is initially positioned at the P range (step 1-1). At this stage, lock pin 11 is positioned at frontmost P range restricting groove 44*p* in restricting groove 44 (depth D3), and an upper portion of P range restricting groove 44*p* is closed by arm portion 72. Detent pin 19 is positioned at frontmost P range clicking sensation groove 33*p* out of clicking sensation grooves 33 of detent member 30.

Next, when a foot brake is stepped in by a user, second solenoid 60 is driven so that lock slider 70 is displaced frontward (step 1-2). As a result, arm portion 72 retracts frontward, and the upper portion of P range restricting groove 44*p* is opened. Next, when button 6 is pressed by two stages by a user, lock pin 11 is elevated to a position at depth D1 (step 1-3). Then, when operating unit 4 is slid rearward by one range in such a state, lock pin 11 enters R range restricting groove 44*r* beyond projection 44*a* (step 1-4).

When operating step is shifted to step 1-4 from step 1-3, detent pin 19 is slid so as to traverse spiral groove 31 following an outer peripheral surface of detent member 30 in directions along axis A. Further, when detent pin 19 is shifted to R range clicking sensation groove 33*r* from P range clicking sensation groove 33*p*, the clicking sensation is imparted to a user corresponding to shapes of respective clicking sensation grooves 33*p*, 33*r* and shapes of clicking sensation crests between the respective clicking sensation grooves. Step 1-4 shown in FIG. 8 indicates lever input device 1 in a state where operating unit 4 is slid and, thereafter, the operation of button 6 is released, and the operation of the foot brake is also released.

Manner of Operation From R Range to P Range

The manner of operation when operating unit 4 is switched from the R range to the P range is described with reference to FIG. 9. Also in FIG. 9, for the sake of convenience of description, some parts of the configuration are omitted.

Figure 9:
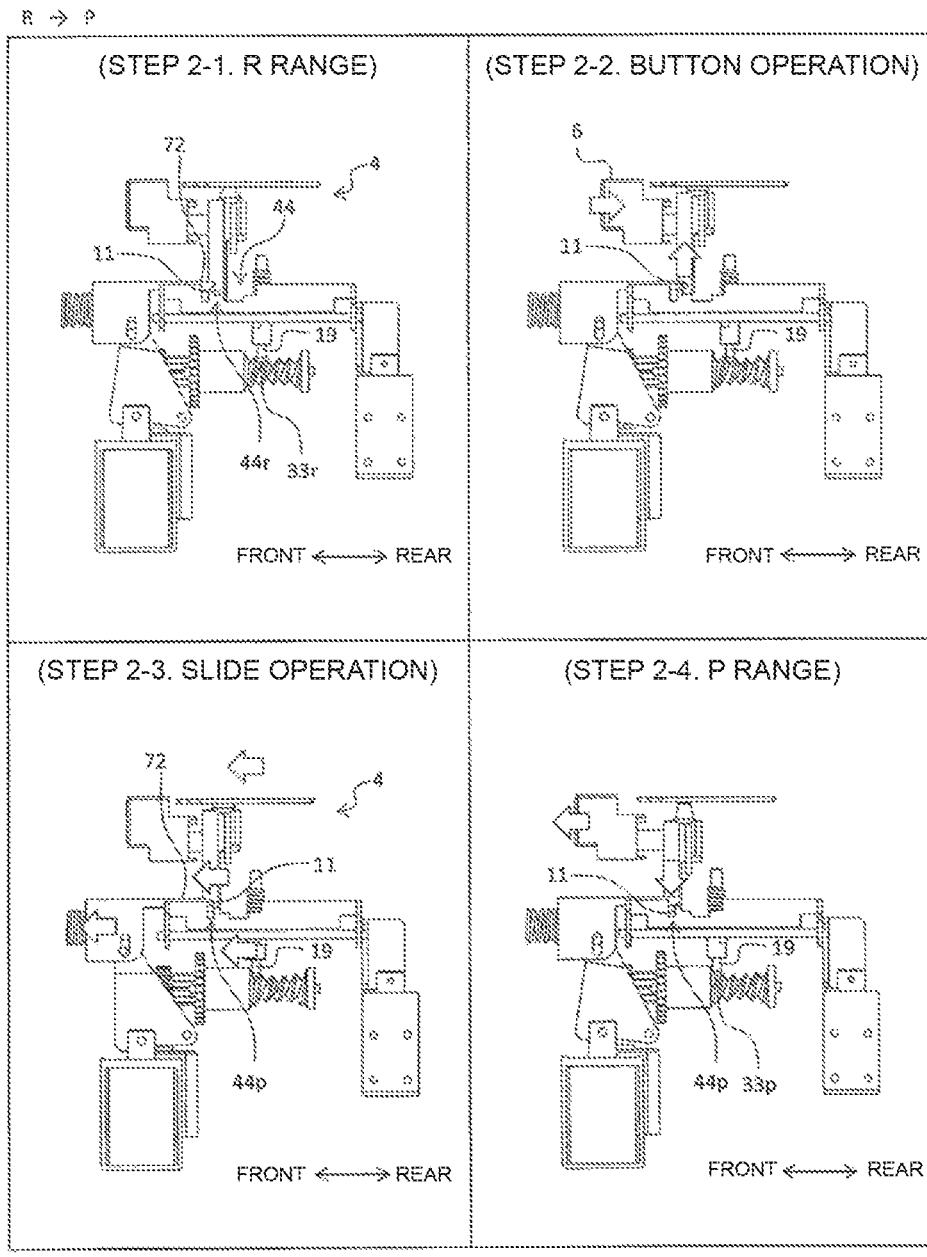
FIG. 9 is a schematic view for describing the manner of operation of the lever input device at the time of switching the range from the R position to the P position.

As illustrated in FIG. 9, operating unit 4 is initially positioned at the R range (step 2-1). At this stage, lock pin 11 is positioned at R range restricting groove 44*r* which is second restricting groove out of restricting grooves 44 counted from a front side (depth D2), and detent pin 19 is positioned at R range clicking sensation groove 33*r* which is second clicking sensation groove out of clicking sensation grooves 33 counted from a front side in detent member 30. An upper portion of P range restricting groove 44*p* is closed by arm portion 72.

Next, when button 6 is pressed by two stages by a user, lock pin 11 is elevated to a position at depth D1 (step 2-2). At this stage, elevated lock pin 11 is positioned at substantially the same height as a distal end portion on a rear side of arm portion 72. When a user slides operating unit 4 frontward by only one range in such a state, lock pin 11 moves frontward while pressing arm portion 72 and arrives at an upper portion of P range restricting groove 44*p* (step 2-3). Then, when the operation of button 6 is released at such a position, lock pin 11 enters P range restricting groove 44*p* and, at the same time, arm portion 72 covers the upper portion of P range restricting groove 44*p* which is biased rearward again (step 2-4).

When operating step is shifted to step 2-3 from step 2-2, detent pin 19 is slid so as to traverse spiral groove 31. Then, when detent pin 19 is shifted from R range clicking sensation groove 33*r* to P range clicking sensation groove 33*p*, the clicking sensation is imparted to a user corresponding to shapes of respective clicking sensation grooves 33*r*, 33*p* and shapes of clicking sensation crests between the respective clicking sensation grooves.

Manner of Operation From R Range to N Range

The manner of operation when operating unit 4 is switched from the R range to the N range is described with reference to FIG. 10. Also in FIG. 10, for the sake of convenience of description, some parts of the configuration are omitted.

Figure 10:
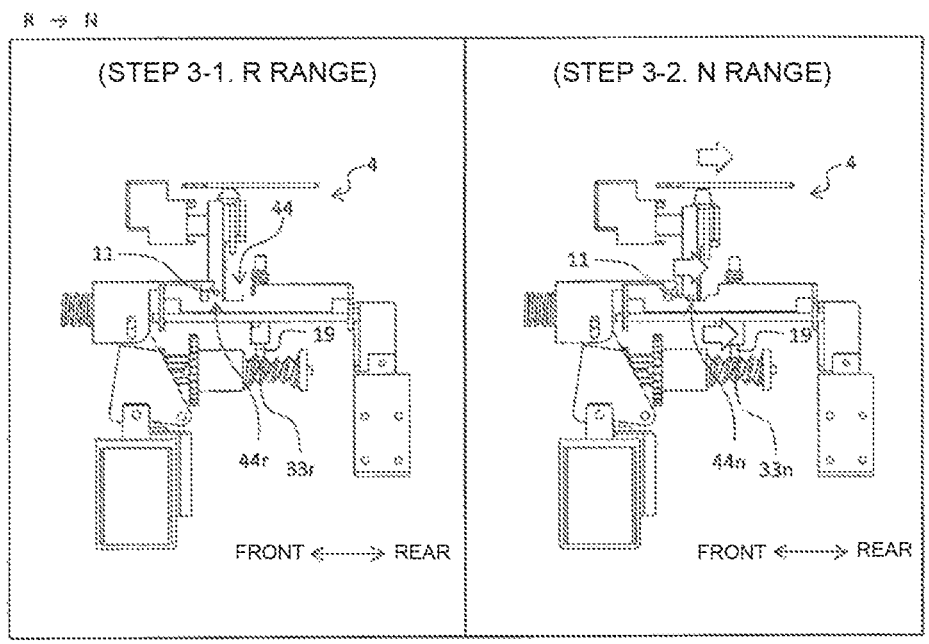
FIG. 10 is a schematic view for describing the manner of operation of the lever input device at the time of switching the range from the R position to an N position.

As illustrated in FIG. 10, operating unit 4 is initially positioned at the R range (step 3-1). At this stage, lock pin 11 is positioned at R range restricting groove 44*r* which is second restricting groove out of restricting grooves 44 counted from a front side (depth D2), and detent pin 19 is positioned at R range clicking sensation groove 33*r* which is second clicking sensation groove out of clicking sensation grooves 33 counted from a front side in detent member 30.

Next, when a user slides operating unit 4 rearward by one range, lock pin 11 moves to N range restricting groove 44*n* (step 3-2). That is, R range restricting groove 44*r* before displacement has depth D2, and N range restricting groove 44*n* after displacement has depth D3 deeper than depth D2. Accordingly, at the time of switching operating unit 4 from the R range to the N range, it is unnecessary for a user to elevate lock pin 11 by pushing button 6, and the user can complete switching only by sliding operating unit 4.

When operating step is shifted to step 3-2 from step 3-1, detent pin 19 is slid so as to traverse spiral groove 31. Then, when detent pin 19 is shifted to N range clicking sensation groove 33*n* from R range clicking sensation groove 33*r*, the clicking sensation is imparted to a user corresponding to shapes of respective clicking sensation grooves 33*r*, 33*n* and shapes of clicking sensation crests between the respective clicking sensation grooves.

Manner of Operation From N Range to R Range

The manner of operation when operating unit 4 is switched from the N range to the R range is described with reference to FIG. 11. Also in FIG. 11, for the sake of convenience of description, some parts of the configuration are omitted.

Figure 11:
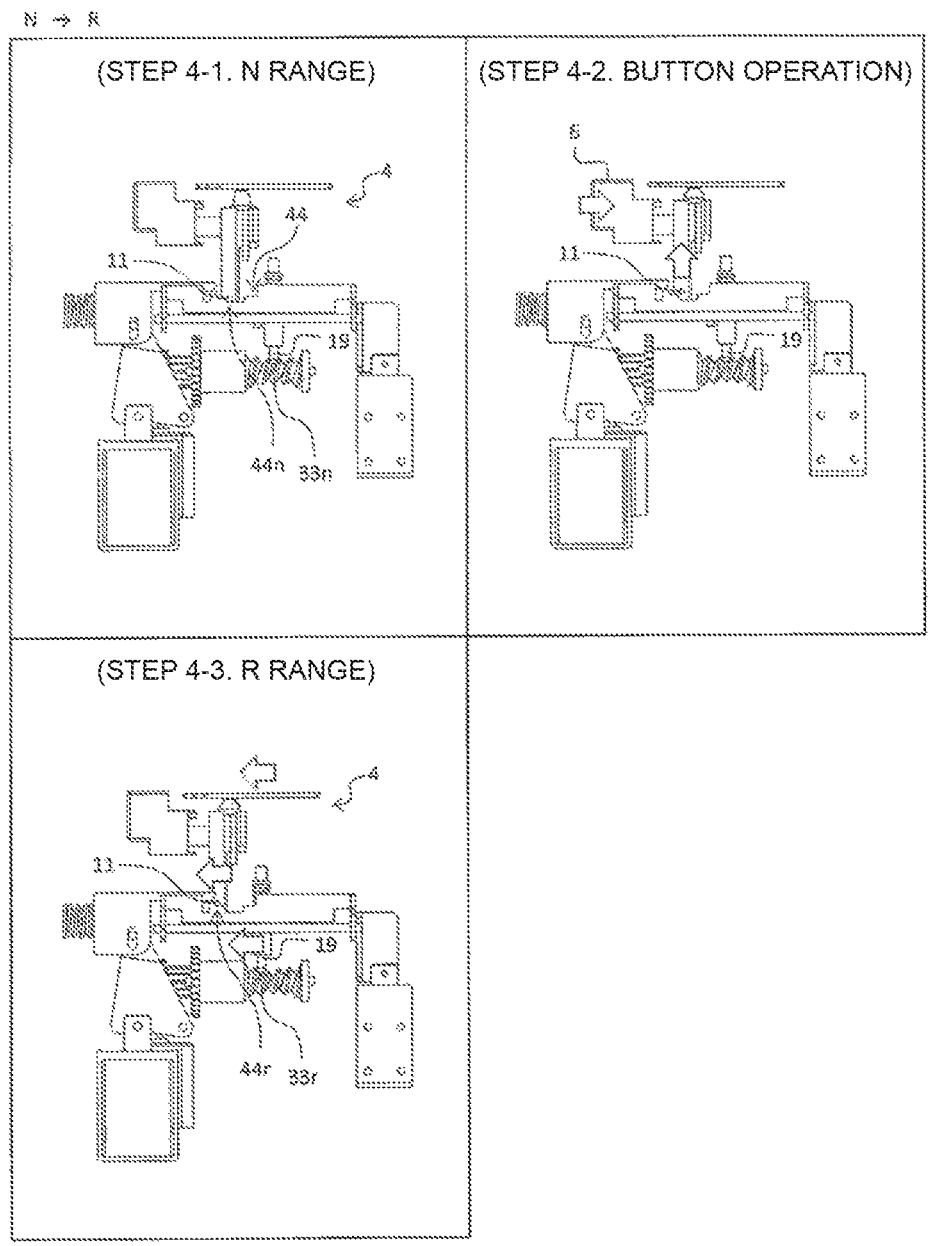
FIG. 11 is a schematic view for describing the manner of operation of the lever input device at the time of switching the range from the N position to the R position.

As illustrated in FIG. 11, operating unit 4 is initially positioned at the N range (step 4-1). At this stage, lock pin 11 is positioned at N range restricting groove 44*n* which is third restricting groove out of restricting grooves 44 counted from a front side (depth D3), and detent pin 19 is positioned at N range clicking sensation groove 33*n* which is third clicking sensation groove out of clicking sensation grooves 33 counted from a front side in detent member 30.

Next, when button 6 is pressed by one stage by a user, lock pin 11 is elevated to the position at depth D2 (step 4-2). When a user slides operating unit 4 frontward by only one range in such a state, lock pin 11 arrives at an upper portion of R range restricting groove 44*r*, and operating unit 4 is positioned at the R range (step 4-3).

When operating step is shifted to step 4-3 from step 4-2, detent pin 19 is slid so as to traverse spiral groove 31. Then, when detent pin 19 is shifted to R range clicking sensation groove 33*r* from N range clicking sensation groove 33*n*, the clicking sensation is imparted to a user corresponding to shapes of respective clicking sensation grooves 33*n*, 33*r* and shapes of clicking sensation crests between the respective clicking sensation grooves.

Manner of Operation Between Other Ranges

In the same manner as the operation between the above-mentioned ranges, switching between other ranges can be performed. For example, between the N range and the D range, switching can be performed by merely sliding operating unit 4 without operating button 6. Switching from the D range to the S range can be performed by sliding operating unit 4 in a state where button 6 is pressed, and switching from the S range to the D range can be performed by merely sliding operating unit 4 without operating button 6. Further, in either switching from the D range to the S range or switching from the S range to the S range, detent pin 19 is slid so as to traverse spiral groove 31. Accordingly, it is possible to generate the clicking sensation corresponding to a shape of a portion of detent portion 32 which detent pin 19 traces.

About Manner of Operation in Automatic Operation State

Next, the manner of operation of above-mentioned lever input device 1 in an automatic operation state is described. In the vehicle provided with lever input device 1 of the present disclosure, when a user performs a predetermined operation or when the controller mounted on the vehicle determines that the vehicle is in a state where a predetermined condition is satisfied, for example, an operation state is shifted to an automatic operation state where, for example, an automatic parking function is operated and the movement of operating unit 4 is automatically controlled by the controller of the vehicle.

When the vehicle is brought into the automatic operation state, based on an input signal from the vehicle, the first solenoid is driven so that plunger 51 is moved upward, and the pair of right and left lock plates 40 are inclined so as to be opened outward. Specifically, lock plates 40 are respectively shifted from a restricting position where plate portions 41 are erected upright so that restricting lock pin 11 is restricted as illustrated in FIG. 6 to a non-restricting position where plate portions 41 are inclined so that lock pin 11 is not restricted by plate portions 41 as illustrated in FIG. 7. As a result, restricting groove 44 of lock plate 40 is not engaged with lock pin 11 of operating unit 4.

Figure 12:
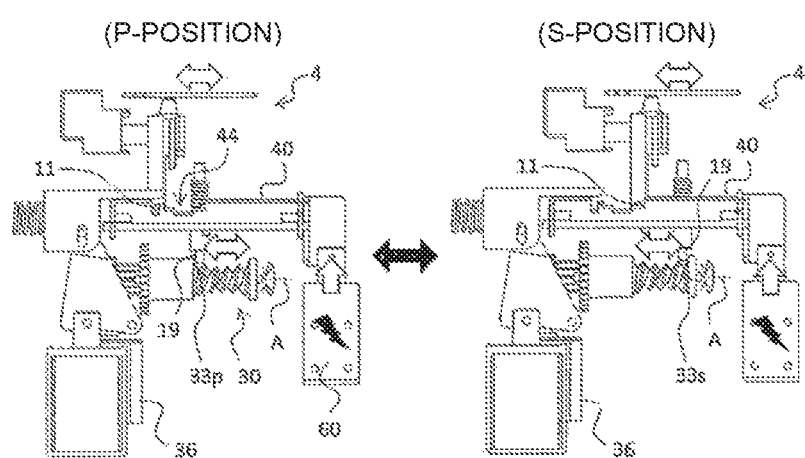
FIG. 12 is a schematic view for describing the manner of operation of the lever input device at the time of switching the range from the P position to an S position.

As illustrated in FIG. 12, during an automatic operation state, lock plate 40 is maintained at the non-restricting position. Then, due to driving of motor 36 which is controlled by the controller of the vehicle, operating unit 4 is automatically slid between the ranges from the P range to the S range without being operated by a user.

For example, motor 36 is driven corresponding to a state of a transmission which is mounted on the vehicle, and detent member 30 is rotated such that a range of the transmission and a range position of operating unit 4 of lever input device 1 agree with each other. When detent member 30 is rotated, detent pin 19 is slid along spiral groove 31, and detent pin 19 is guided in directions along axis A. As a result, operating unit 4 is also automatically slid in the directions along axis A together with detent pin 19 and is moved to a predetermined range position.

Other Matters Relating to Detent Member

Each time detent member 30 is rotated by one turn about axis A, operating unit 4 moves to a next neighboring range position. Accordingly, when operating unit 4 is at an arbitrary position, detent member 30 constantly takes a predetermined posture (at the same rotating position (phase) about axis A). That is, for example, when operating unit 4 is at the P range, a portion of detent portion 32 positioned at an upper side of detent portion 32 is positioned also at an upper side when operating unit 4 is at another arbitrary position.

Figure 13:
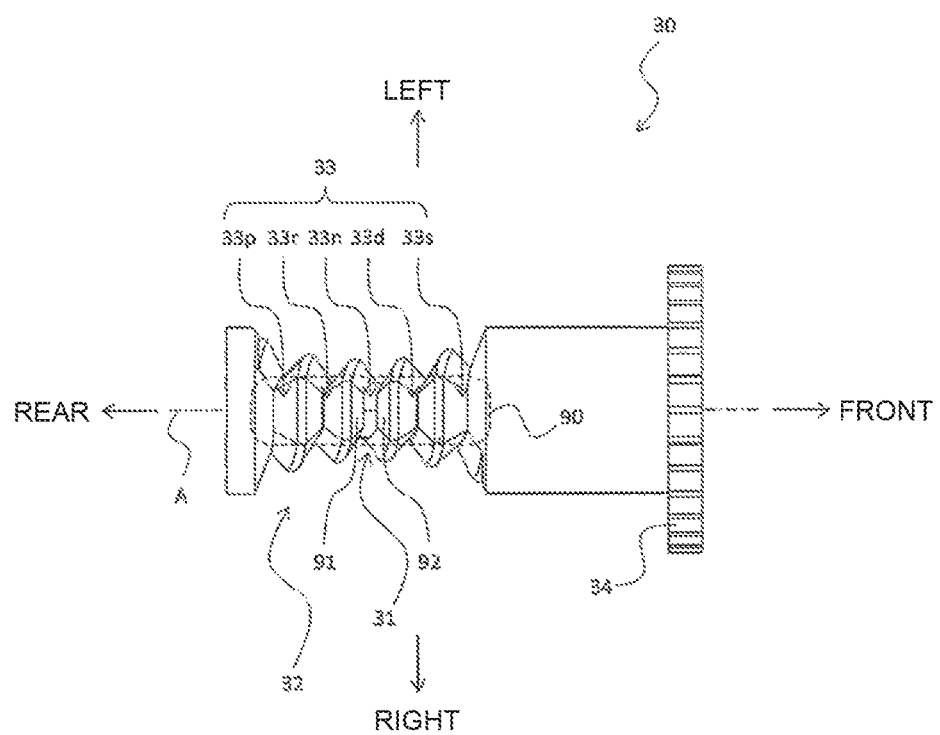
FIG. 13 is a plan view of a detent member as viewed from above.

FIG. 13 is a plan view of detent member 30 as viewed from above. As illustrated in FIG. 13, a portion of detent portion 32 positioned an upper side of detent portion 32 when operating unit 4 is positioned at an arbitrary range position is positioned within a predetermined angle about axis A, and forms a region along axis A. Hereinafter, such a region is referred to as a detent region 90.

In lever input device 1 of the present disclosure, even in a case where detent member 30 is rotated in an automatic operation state and operating unit 4 is slid, when operating unit 4 is stopped at any range position, detent pin 19 is positioned at clicking sensation groove 33 (either one of clicking sensation grooves 33*p*, 33*r*, 33*n*, 33*d*, 33*s*) corresponding to the range position of detent pin 19. Further, these clicking sensation grooves 33 are positioned in detent region 90 described above. Accordingly, by suitably designing a shape of a portion corresponding to detent region 90 out of a portion over the entire length of spiral groove 31, particularly, an contour shape (profile) of the portion as viewed in a side view, clicking sensation generated at the time of switching between arbitrary ranges in the manual operation state can be different.

As described above, in the automatic operation state, detent member 30 is rotated by driving motor 36 and is stopped in a state where operating unit 4 is at an arbitrary range position. However, there may be a case where such a stopped posture (a phase about axis A in a stopped state) is not always fixed strictly. For example, depending on a timing at which input power supplied to motor 36 is changed, there may be a case where detent member 30 is stopped with a slight angle error about axis A.

On the other hand, when such a positional displacement of detent member 30 occurs, a contact position between detent pin 19 and spiral groove 31 differs each time. Further, when spiral groove 31 is formed so as to turn uniformly over the entire length thereof, a change in contact position between detent pin 19 and spiral groove 31 becomes a factor which causes a change in clicking sensation. That is, even when a user performs switching within the same range, there is a possibility that the clicking sensation slightly differs every time switching is performed.

In view of the above, detent member 30 included in lever input device 1 of the present disclosure has a configuration for preventing the occurrence of difference in clicking sensation at the time of switching within the same range. That is, as illustrated in FIG. 13, out of one continuous spiral groove 31, spiral groove 31 corresponding to a portion of clicking sensation groove 33 positioned in the detent region 90 described above has inclined surfaces 91, 92 which are in slide contact with detent pin 19. Out of inclined surfaces 91, 92, portions within a predetermined angle region about axis A, that is, portions within detent region 90 are formed such that a cross section orthogonal to axis A is formed into a shape where concentric arcs about axis A are formed continuously in a radial direction. Detent region 90 can be set within a range of from 36 degrees to 108 degrees (10% to 30% of 360 degrees) about axis A. Inclined surfaces 91, 92 may be formed into a planar shape, a concave surface shape, or a convex surface shape from a bottom portion of spiral groove 31 to distal end portions of inclined surfaces 91, 92 corresponding to desired clicking sensation.

By forming such a conical surface in detent region 90, as long as a contact point between detent pin 19 and spiral groove 31 is positioned within detent region 90, a shape of the upper portion of detent portion 32 as viewed in a side view (profile) maintains the same shape. That is, irrespective of a rotational position of detent portion 32, a position of detent pin 19 along axis A is unchanged. Accordingly, there is no difference in clicking sensation at the time of performing a switching operation within the same range.

In the above-mentioned description, lever input device 1 of a type where operating unit 4 is moved in a slidable manner is exemplified. However, the present disclosure is not limited to such a lever input device 1. For example, the present disclosure is also applicable to a lever input device of a type where operating unit 4 is moved in a swingable manner in front-rear directions with respect to an axis extending in right-left directions. The present disclosure is also applicable to a rotary-type input device in a case where a mechanism which converts a rotary motion and a linear motion such as a lack and pinion is interposed in the input device. Further, in the above-mentioned description, the mode where lock plate 40 is switched between the restricting position and the non-restricting position so as to be opened or closed in the right-left directions is exemplified. However, the present disclosure is not limited to the above-mentioned mode. For example, lock plate 40 may be switched to the non-restricting position where lock plate 40 is not engaged with lock pin 11 by translationally moving lock plate 40 outward from the restricting position illustrated in FIG. 6. Alternatively, lock plate 40 may be switched to the non-restricting position where lock plate 40 is not engaged with lock pin 11 by lowering lock plate 40 downward.

Although the present disclosure has been sufficiently described in connection with preferred embodiments with reference to the accompanying drawings, it is evident for those skilled in the art that various changes and modifications can be made based on the embodiments. Such changes and modifications are, insofar as they do not deviate from the scope of the present disclosure according to the appended claims, it is to be understood as included therein.

INDUSTRIAL APPLICABILITY

The present disclosure is applicable to a lever input device such as a shift lever of a vehicle, for example.

The invention claimed is:

1. An input device comprising:
   an operating unit;
   a detent pin that is displaceable in a first direction and a second direction opposite to the first direction, the detent pin is configured to be displaced by an operation of the operating unit;
   a detent member having a columnar shape, the detent member including a spiral groove on an outer peripheral surface of the detent member, the spiral groove having a predetermined axis, the outer peripheral surface being in contact with the detent pin, the spiral groove being continuous along the outer peripheral surface of the detent member and having a plurality of crests along the detent member; and
   a rotary driving part coupled to the detent member, the rotary driving part is configured to rotate the detent member about the predetermined axis
   wherein when the operating unit is operated in a first state by a user, the detent pin moves slidably so as to traverse a respective crest of the plurality of crests of the spiral groove along the outer peripheral surface of the detent member in the first direction or in the second direction, and a clicking sensation corresponding to a position of the detent pin is imparted, and
   wherein when the detent member is rotated in a second state where the operating unit is operated by the rotary driving part, the detent pin moves slidably along the spiral groove, is guided along the spiral groove, and is displaced in the first direction or in the second direction.

2. The input device according to claim 1, wherein
   the detent member further includes an inclined surface, the inclined surface is part of the spiral groove and is in slide contact with the detent pin, and the inclined surface includes a predetermined angle region about the predetermined axis, the predetermined angle region includes a shape where concentric arcs about the predetermined axis are continuous in a radial direction, and when the detent pin is at the predetermined angle region of the spiral groove, regardless of a rotation position of the detent member, the position of the detent pin along the predetermined axis is unchanged.

3. The input device according to claim 1, further comprising:
a lock pin that is displaceable in the first direction and the second direction along with an operation of the operating unit;
a lock pin restricting member restricts displacement of the lock pin in the first direction and the second direction; and
a restriction switching part switches a position of the lock pin restricting member between a restricting position where displacement of the lock pin in the first direction and the second direction is restricted and a releasing position where the lock pin is released from the restricting position.

4. The input device according to claim 1, wherein:
the input devices is a shift device of a vehicle; and
the operating unit further includes a plurality of range positions, and when the detent member is rotated once about the axis in the second state where the operating unit is operated by the rotary driving part, the detent pin moves slidably along the spiral groove, and is guided to a first range position from a second range position, the first range position being adjacent to the second range position.

5. An input device comprising:
an operating unit;
a detent pin displaceable in a first direction and a second direction opposite to the first direction, the detent pin configured to be displaced by an operation of the operating unit;
a detent member having a columnar shape, an outer peripheral surface, and a spiral groove continuous along the outer peripheral surface of the detent member, the spiral groove includes a plurality of crests and a predetermined axis; and
wherein when the operating unit is operated in a manual state by a user, the detent pin is displaced in the first direction or the second direction and traverses at least one of the plurality of crests of the spiral groove.

6. The input device of claim 5, further comprises:
a rotary driving part coupled to the detent member, the rotary driving part is configured to rotate the detent member about the predetermined axis of the spiral groove.

7. The input device of claim 6, wherein when the detent member is rotated in an automatic state by the rotary driving part, the detent pin moves slidably along the spiral groove between the plurality of crests.

8. The input device of claim 7, wherein:
the detent member includes a plurality of range positions, and when the detent member is rotated once about the predetermined axis in the automatic state, the detect pin moves slidably along the spiral groove from a first range position of the plurality of range positions to a second range position of the plurality of range positions, the first range position being directly adjacent to the second range position.

9. The input device of claim 5, wherein when the detent pin traverses at least one of the plurality of crests of the spiral groove when the operating unit is operated in the manual state by the user a clicking sensation corresponding to a position of the detent pin is imparted.

* * * * *